United States Patent [19]
Hammond

[11] 3,851,666
[45] Dec. 3, 1974

[54] COUPLING ASSEMBLY

[75] Inventor: Harry H. Hammond, Middleburg Heights, Ohio

[73] Assignee: The Hansen Manufacturing Company, Cleveland, Ohio

[22] Filed: Mar. 9, 1973

[21] Appl. No.: 339,701

[52] U.S. Cl........... 137/614.04, 251/149.6, 251/333
[51] Int. Cl............................................. F16l 37/28
[58] Field of Search.......... 137/614, 614.01, 614.02, 137/614.03, 614.04, 614.05; 251/149, 149.1, 149.6, 149.7, 149.8, 332

[56] References Cited
UNITED STATES PATENTS

| | | | |
|---|---|---|---|
| 2,428,637 | 10/1947 | Scheiwer...................... | 137/614.04 |
| 2,665,928 | 1/1954 | Omon et al................ | 137/614.04 X |
| 2,823,048 | 2/1958 | Hansen...................... | 137/614.04 X |
| 2,896,977 | 7/1959 | Hansen...................... | 137/614.04 X |
| 3,144,237 | 8/1964 | Zurit et al.................. | 251/332 X |
| 3,155,402 | 11/1964 | Cornelius................... | 137/614.04 X |
| 3,200,839 | 8/1965 | Gallagher................... | 251/332 X |
| 3,236,251 | 2/1966 | Hansen...................... | 137/614.05 |
| 3,251,574 | 5/1966 | Hansen...................... | 251/149.7 |
| 3,428,076 | 2/1969 | Lowe.......................... | 251/333 X |
| 3,532,115 | 10/1970 | Hodil, Jr.................... | 251/332 X |
| 3,537,478 | 11/1970 | Evans......................... | 137/614.04 |
| 3,605,793 | 9/1971 | Kinsel......................... | 251/332 X |
| 3,664,375 | 5/1972 | Marette...................... | 137/614.02 X |

Primary Examiner—Charles J. Myhre
Assistant Examiner—Ira S. Lazarus

[57] ABSTRACT

An improved quick-connect coupling assembly includes a plug and socket which are interconnectable to connect a pair of conduits in fluid communication. As the plug and socket are interconnected, a valve member in the socket is moved from a closed position blocking fluid flow through the socket to an open position. This valve member includes a frustro-conical pilot portion which functions to guide movement of the valve member relative to a valve seat. The largest or major end of the pilot portion has a diameter which is less than the diameter of a circular opening circumscribed by the valve seat. A seal ring is disposed adjacent to the major end of the pilot portion and has an outside diameter which is greater than the diameter of the major end of the pilot protion. Adjacent to the seal ring is a circular support plate having an external diameter which is greater than the diameter of the seal ring. As the plug and socket are disconnected and the valve is closed, the pilot portion passes through the opening and the seal ring moves into sealing engagement with the valve seat. When the valve is closed, the support plate engages the valve seat and prevents the application of a full static load by the valve member against the seal ring while still allowing for adequate pressure to provide a fluid tight seal between the valve seat and seal ring.

5 Claims, 3 Drawing Figures

PATENTED DEC 3 1974
3,851,666

COUPLING ASSEMBLY

BACKGROUND OF THE INVENTION

An improved coupling assembly constructed in accordance with the present invention includes a socket member having an internal valve which blocks fluid flow through the socket member when the coupling assembly is disconnected.

There are many known coupling assemblies having plug and socket members with internal valves which are urged toward a closed position under the influence of biasing springs. One of these coupling assemblies is disclosed in the U.S. Pat. No. 3,144,237 and includes a socket valve having an annular seal which engages a valve seat. The socket valve has a pilot portion which serves to center the valve relative to the valve seat. This pilot portion of the valve has an external diameter which is larger than an outlet opening circumscribed by the valve seat so that a metallic surface of the pilot portion engages the valve seat when the valve is closed. A resilient seal ring is disposed inwardly of the pilot portion and also engages the valve seat.

SUMMARY OF THE PRESENT INVENTION

The present invention provides a coupling having a socket member with an improved internal socket valve assembly. The socket valve assembly includes a valve member which has a frustro-conical pilot portion which cooperates with a frustro-conical valve seat to center the valve member relative to the valve seat as the valve member is moved from an open position to a closed position. This frustro-conical pilot portion has a major or maximum diameter which is less than the diameter of an outlet opening circumscribed by the valve seat.

As the valve member moves from the open position toward the closed position, the pilot portion passes through the outlet opening and a resilient seal ring behind the pilot portion moves into engagement with the valve seat. Since the pilot portion has a smaller diameter than the outlet opening, the force of a biasing spring presses the seal ring against the valve seat to form a tight seal. Excessive deformation of the seal ring is prevented by a support plate behind the seal ring. Therefore if the seal ring should wear, a seal is still obtained between the valve member and the valve seat by contact of the support plate with the valve seat.

Accordingly, it is the object of this invention to provide a new and improved coupling assembly having a socket valve with a frustro-conical pilot portion having a major or maximum diameter which is less than the diameter of an opening which is blocked by the valve when it is in a closed position to enable the pilot portion to pass through the opening and a seal ring to be pressed against a valve seat as the valve closes.

Another object of this invention is to provide a new and improved coupling assembly in accordance with the next preceding object and wherein a support plate is disposed inwardly of the seal ring and engages the valve seat when the valve is closed to prevent the application of the full force of a biasing spring to the seal ring.

Another object of this invention is to provide a new and improved coupling assembly which is inexpensive to manufacture and has an internal valve assembly which has a relatively long service life and is reliable in operation.

BRIEF DESCRIPTION OF THE DRAWINGS

The foregoing in other objects and features of the present invention will become more apparent upon a consideration of the following description taken in connection with the accompanying drawings wherein.

DESCRIPTION OF ONE PREFERRED EMBODIMENT

Figure 1:
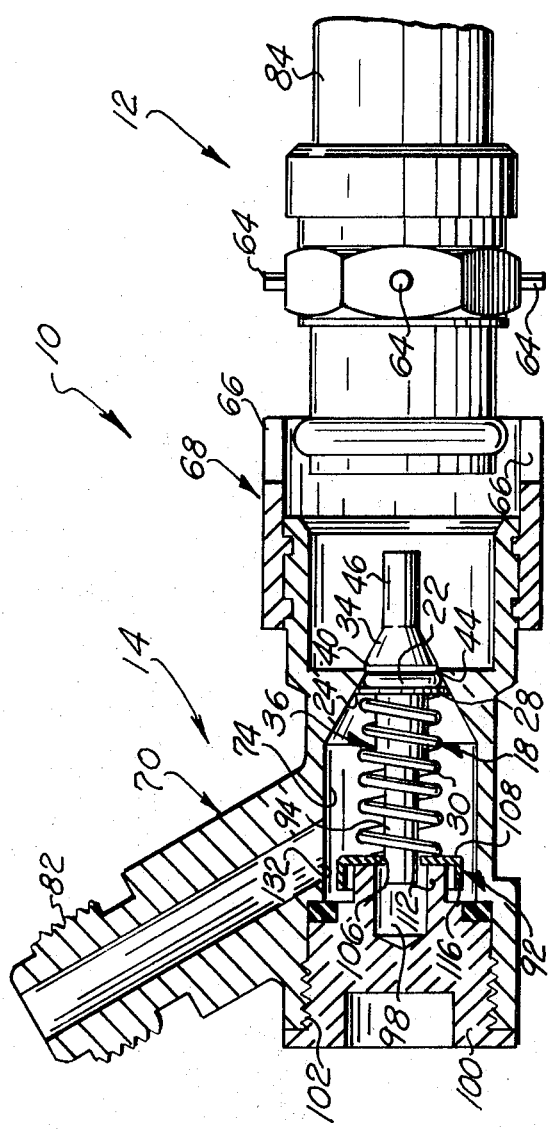
FIG. 1 is an illustration of a coupling assembly constructed in accordance with the present invention, the coupling assembly being shown disconnected with a socket valve closed.

A coupling assembly 10 constructed in accordance with the present invention is shown in FIG. 1 in a disconnected condition in which plug and socket members 12 and 14 are freely movable relative to each other. When the coupling assembly 10 is disconnected, a socket valve assembly 18 blocks fluid flow through the socket member 14. The socket valve assembly 18 includes an annular seal ring 22 which sealingly engages an annular valve seat 24. The seal ring 22 is pressed toward the valve seat 24 by a circular support plate 28 under the influence of a biasing spring 30. A frustro-conical pilot portion 34 of a valve member 36 has a major end 40 (FIG. 3) with an outside diameter which is less than the diameter of a circular outlet opening 44 circumscribed by the valve seat 24. This enables the pilot portion 34 to be disposed outwardly of the valve seat 24 when the valve assembly 18 is in the closed condition of FIG. 1. When the valve assembly 18 is closed, the support plate 28 engages the valve seat 24 to prevent excessive deformation of the seal ring 22.

Figure 2:
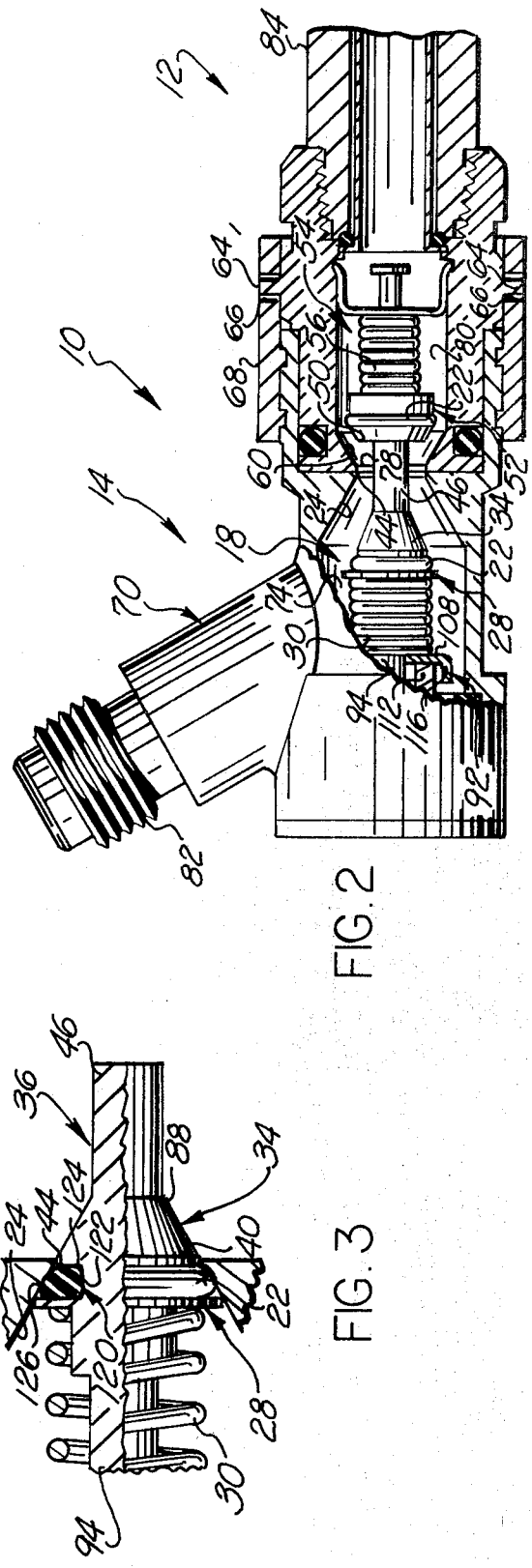
FIG. 2 is an illustration, similar to FIG. 1 of the coupling assembly in a connected condition with socket and plug valves open.

When the coupling assembly 10 is operated from the disconnected condition of FIG. 1 to the connected condition of FIG. 2, the plug and socket members 12 and 14 are moved axially toward each other. As they move together, a cylindrical nose or leading end portion 46 of the valve member 36 moves into abutting engagement with a flat circular end surface 50 (see FIG. 2) of a valve member 52 in a plug valve assembly 54. The plug valve assembly 54 includes a biasing spring 56 which is weaker or has a lower spring rate than the biasing spring 30 of the socket valve assembly 18. Therefore, continued movement of the plug and socket members 12 and 14 toward each other, after the nose 46 of the socket valve member 36 has engaged the end face 50 of a plug valve member 52, results in the plug valve member 52 being moved away from an annular valve seat 60 toward the open position of FIG. 2 prior to initial movement of the socket valve member 36 from the closed position of FIG. 1.

As the plug and socket 12 and 14 are moved together, outwardly projecting pins 64 on the plug move into engagement with a plurality of slots 66 formed in a general cylindrical sleeve member 68 which is connected with a socket body 70. The slots 66 have offset portions which receive the pins 64 in the manner illustrated in FIG. 2 to hold the plug and socket members together. The interaction between the pins 64 and slots 66 is the same as is disclosed in U.S. Pat. No. 2,896,977 to Hansen. However, it is contemplated that other known types of locking arrangements, such as the one disclosed in U.S. Pat. No. 3,236,251, could be utilized to hold the plug and socket members 12 and 14 together.

When the plug and socket members 12 and 14 are connected as shown in FIG. 2, the seal ring 22 is spaced from the valve seat 24. This enables fluid to flow from a socket valve chamber 74 through a circular outlet opening 44 and an inlet opening 78 (FIG. 2) to a valve chamber 80 in the plug member 12. Of course, this connects a conduit (not shown) connected with external threads 82 on the socket 14 in fluid communication with a conduit 84 connected to the plug member 12.

When the coupling assembly 10 is to be disconnected, it is merely necessary to rotate the plug member 12 slightly to disengage the pins 64 from the offset portions of the slots 66. The plug and socket members 12 and 14 are then moved apart. As they are separated, the relatively strong biasing spring 30 causes the socket valve assembly 18 to close before the plug valve assembly 54 closes. Therefore, the flow of fluid through the socket 14 is blocked before the plug valve assembly 54 blocks the flow of fluid through the plug member 12.

As the socket valve assembly 18 is closed, the minor or leading end 88 of the frustro-conical pilot portion 34 moves toward the generally frustro-conical valve seat 28. If for some unforeseen reason the valve member 36 should be cocked or offset relative to the valve seat 28, the interaction between the pilot portion 34 and the valve seat 24 would center the valve member 36 relative to the outlet opening as the socket valve assembly 18 is closed.

Figure 3:
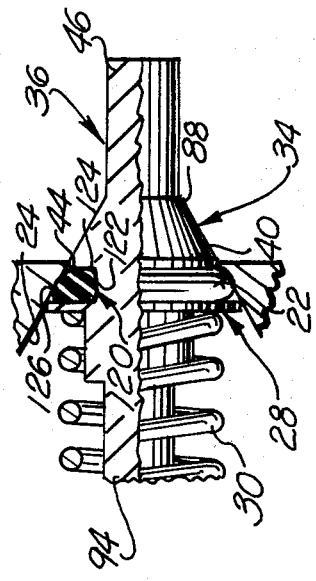
FIG. 3 is an enlarged fragmentary sectional view illustrating the relationship between a frustro-conical pilot portion of the closed socket valve member and a valve seat which is sealingly engaged by a seal ring.

Continued movement of the socket valve assembly 18 toward the closed position results in movement of the major or trailing end 40 of the pilot portion 34 through the circular opening 44 (see FIG. 3). As this occurs, the annular seal ring 22 moves into abutting engagement with the valve seat 24. The biasing spring 30 acts against the circular support plate 28 to press this circular support plate against the annular sloping surface of the valve seat 24. The support plate 28 has a larger diameter than the seal ring 22 and engages the valve seat 24 to hold the seal ring in a confined area to thereby maintain a tight seal with the valve seat. At this time, the frustro-conical pilot portion 34 is disposed outwardly of the valve seat 24 so that the entire force of the spring 30 is utilized to press the support plate 28 and seal ring 22 against the valve seat. The support plate 28 supports the seal ring 22 and presses it against the valve seat to maintain a tight seal.

As the socket valve assembly 18 is operated between the closed position of FIG. 1 and the open position of FIG. 2, a guide member 92 engages a cylindrical inner end or stem 94 of the valve member 36 and guides movement of the valve member. As the valve member 36 moves from the closed position of FIG. 1 to the open position of FIG. 2, the valve stem 94 moves into a cylindrical cavity 98 formed in an externally threaded cap or plug 100 which is received in a general cylindrical internally threaded bore 102 formed in the socket body 70. Thus, as the valve member 36 moves from the closed position to the open position, the stem 94 moves through a circular opening 106 formed in a main portion 108 of the guide member 92. It should be noted that the opening 106 in the guide member 92, valve stem 94, pilot portion 34 and nose portion 46 are all disposed in a coaxial relationship with the opening 44.

The guide member 92 extends across an annular wall 112 which disposed in a coaxial relationship with the valve member 36 and the outlet opening 44. A plurality of legs 116 extend from a main portion of 108 of the guide 92 adjacent to a cylindrical outer surface of the wall 112. The construction of the guide member 92 and its interaction with the valve member 36 is substantially as disclosed in U.S. Pat. No. 2,823,048.

The seal ring 22 is disposed in an annular recess 120 formed in the valve member 36 inwardly of the frustro-conical pilor protion 34. The annular recess 120 (FIG. 3) has an axially extending cylindrical bottom surface 122 with a pair of radially outwardly projecting side surfaces 124 and 126. The radially extending side surface 126 of the annular recess 120 is formed on the circular support plate 28. The circular support plate 28 has an external diameter which is greater than the diameter of the circular outlet opening 44 so that the support plate presses the seal ring 22 against the valve seat 24 and engages the valve seat to limit outward travel of valve member.

Since the major end 40 of the frustro-conical pilot portion 34 has an external diameter which is slightly less than the diameter of the circular outlet opening 44, the pilot portion can pass through the circular outlet opening. However, the seal ring 22 has an outside diameter greater than the diameter of the opening 44. Therefore, the seal ring extends outwardly of the major end 40 of the pilot portion 34 to engage the valve seat 24.

In view of the foregoing description, it is apparent that the coupling assembly 10 include plug and socket members 12 and 14 which are movable between the disconnected condition of FIG. 1 and the connected condition of FIG. 2 to connect a pair of conduits and fluid communication. The socket 14 has a body 70 which defines a valve chamber 74 having an inlet opening 132 and a circular outlet opening 44. When the socket valve assembly 18 is is closed, it blocks fluid flow through the socket member 14.

The socket valve member 36 includes a cylindrical nose portion 46, a frustro-conical pilot portion which is disposed axially inwardly of the nose portion and has a major end 40 of a diameter which is less than the diameter of the outlet opening 44. An annular recess 120 is formed in the valve member 36 inwardly of the pilot portion 34 and holds the annular seal ring 22 in a coaxial relationship with the pilot portion. An annular inner side surface 126 of the recess 120 is formed on a circular support plate 28 and has an external diameter which is greater than the diameter of the outlet opening 44. Therefore, the support plate presses the seal ring 22 against the valve seat 24 under the influence of the biasing spring 30. This is because the major end 40 of the pilot portion 34 is disposed outwardly of the valve seat 24 when the valve assembly 18 is closed.

Having described a specific preferred embodiment of the invention, the following is claimed:

1. A coupling assembly operable between a connected condition interconnecting first and second conduits and a disconnected condition, said coupling assembly comprising plug and socket means for connecting the first and second conduits in fluid communication, said socket means including a socket body defining a first valve chamber having inlet and outlet openings through which fluid enters and leaves said first valve chamber and first valve means for blocking fluid flow through said socket means when said coupling assembly is in the disconnected condition, said first valve means including a first frustro-conical valve seat connected with said socket body and circumscribing one of said openings to said first valve chamber, a first valve member disposed in said first valve chamber and movable relative to said first valve seat between an open position and a closed position, said first valve member including a cylindrical nose portion, a frustro-conical pilot portion disposed inwardly of said nose portion with a minor end of said pilot portion connected to the nose portion and a major end of the pilot portion spaced inwardly of the nose portion, said major end of said pilot portion having a diameter which is less than the diameter of said one of said openings, annular recess means disposed inwardly of said major end of said pilot portion for receiving an annular seal member, an annular seal member disposed in said recess means, said seal member having an outside diameter which is greater than the diameter of the major end of said frustro-conical pilot portion and the diameter of said one of said openings, a circular support portion disposed inwardly of said annular seal member and having a leading end with an external diameter which is greater than the external diameter of said annular seal, said leading end of said circular support portion having a circular support surface which forms an inner side of said recess means, and first spring means for urging said first valve member toward the closed position, said major end of said pilot portion being disposed outwardly of said first valve seat when said first valve member is in the closed position to enable said seal member to be pressed against said first valve seat under the influence of said spring means, said leading end of said circular support portion being disposed in abutting pressure engagement with said first valve seat and an inner side of said seal member when said first valve member is in the closed position to press said seal member against said first valve seat and to limit the pressure applied to said seal member to thereby prevent excessive deformation of said seal member, said plug means including a plug body defining a second valve chamber having inlet and outlet openings through which fluid enters and leaves said second valve chamber and second valve means for blocking fluid flow through said plug means when said coupling assembly is in the disconnected condition.

2. A coupling assembly as set forth in claim 1 wherein said second valve means includes a second valve seat connected with said plug body, a second valve member disposed in said second valve chamber, and second spring means for urging said second valve member toward said second valve seat, said second valve member having an outer surface means for engaging said nose portion of said first valve member upon operation of said coupling assembly from the disconnected condition to the connected condition, said first spring means having a higher spring rate than said second spring means to provide for movement of said second valve member toward the open condition prior to initiation of movement of said first valve member toward the open condition upon operation of said coupling assembly from the disconnected condition to the connected condition.

3. A coupling assembly as set forth in claim 1 wherein said socket body includes means for defining a generally cylindrical and internally threaded passage disposed in a coaxial relationship with said one of said inlet and outlet openings and an externally threaded member disposed in threaded engagement with said internally threaded passage, said externally threaded member including surface means for defining an axially extending cavity, said valve means further including guide means disposed in engagement with said externally threaded member for guiding movement of said first valve member between the open and closed positions, said first valve member having an inner end portion which extends into said cavity to a greater extent when said first valve member is in the open position than when said first valve member is in the closed position.

4. A coupling assembly as set forth in claim 3 wherein said externally threaded member includes a cylindrical wall projecting axially toward said one of said openings and defining at least a portion of said cavity, said guide means including a main portion extending across an outer end of said cylindrical wall in a direction transverse to the direction of movement of said valve member between the open and closed positions and defining an opening through which said valve member extends into said cavity.

5. A coupling assembly as set forth in claim 4 wherein said guide means further includes a plurality of legs extending transversely to said main portion of said guide means and are disposed adjacent to an outer surface of said wall.

* * * * *